United States Patent
Lee et al.

(10) Patent No.: US 10,161,117 B2
(45) Date of Patent: Dec. 25, 2018

(54) COUPLING STRUCTURE FOR EASY INSTALLATION AND SEPARATION OF FAUCET

(71) Applicants: Idin Lab, Inc., Seoul (KR); PLUMB FAST CO., LTD., Sejong (KR)

(72) Inventors: Yong Woon Lee, Seoul (KR); Jin Su Jeon, Bucheon-si (KR); Jae Hee Won, Daejeon (KR); Do Kyeong Lee, Seoul (KR)

(73) Assignee: IDIN LAB, INC., Seoul (KR)

( * ) Notice: Subject to any disclaimer, the term of this patent is extended or adjusted under 35 U.S.C. 154(b) by 0 days.

(21) Appl. No.: 15/500,257

(22) PCT Filed: Jan. 22, 2015

(86) PCT No.: PCT/KR2015/000670
§ 371 (c)(1),
(2) Date: Jan. 30, 2017

(87) PCT Pub. No.: WO2016/017881
PCT Pub. Date: Feb. 4, 2016

(65) Prior Publication Data
US 2017/0218604 A1  Aug. 3, 2017

(30) Foreign Application Priority Data
Aug. 1, 2014  (KR) .................. 10-2014-0099078

(51) Int. Cl.
*E03B 3/02* (2006.01)
*E03C 1/04* (2006.01)
*E03C 1/042* (2006.01)

(52) U.S. Cl.
CPC ............ *E03C 1/0403* (2013.01); *E03C 1/042* (2013.01)

(58) Field of Classification Search
CPC .......... E03C 1/0402; E03C 1/042; E03C 1/04; E03C 1/0403
(Continued)

(56) References Cited

U.S. PATENT DOCUMENTS 4,964,657 A * 10/1990 Gonzales .............. F16L 19/086
285/332
7,475,913 B2   1/2009 Muto
(Continued)

FOREIGN PATENT DOCUMENTS

DE   202008006949   9/2008
EP       1178255    2/2002
(Continued)

OTHER PUBLICATIONS

International Search Report—PCT/KR2015/000670 dated May 8, 2015.

*Primary Examiner* — Marina Tietjen
*Assistant Examiner* — Paul J Gray
(74) *Attorney, Agent, or Firm* — Cantor Colburn LLP

(57) ABSTRACT

Provided is a coupling structure for easy installation and separation of a faucet. The coupling structure includes a connection body which is connected to a water supply pipe at one side and has a coupler at an opposite side. A connection pipe formed in the faucet is fitted to the coupler such that the faucet is coupled to the connection body to allow the faucet to be supplied with water and to discharge the water. A grab ring is formed in the coupler, and an actuation ring is installed in the connection pipe so as to be moved forward and backward. When the actuation ring is moved forward, the actuation ring expands the grab ring to allow the connection pipe to be separated from the coupler. Easy installation of the faucet enhances convenience in
(Continued)

construction. Easy separation of the faucet, when necessary, enhances convenience in maintenance.

2 Claims, 5 Drawing Sheets

(58) Field of Classification Search
USPC ......... 137/315.2, 359, 360; 285/18, 39, 340, 285/389, 385
See application file for complete search history.

(56) References Cited

U.S. PATENT DOCUMENTS

| | | | |
|---|---|---|---|
| 8,303,001 B2* | 11/2012 | Oh | F16L 25/0045 285/340 |
| 2004/0240940 A1 | 12/2004 | Ericksen et al. | |
| 2006/0108804 A1 | 5/2006 | Ball | |
| 2013/0042926 A1* | 2/2013 | Jonte | E03C 1/0402 137/315.12 |

FOREIGN PATENT DOCUMENTS

| | | |
|---|---|---|
| JP | 10060964 | 3/1998 |
| JP | 11063347 | 3/1999 |
| JP | 2001304476 | 10/2001 |
| KR | 200170279 | 2/2000 |
| KR | 200337741 | 1/2004 |
| KR | 20070115388 | 12/2007 |
| KR | 20100063411 | 6/2010 |
| KR | 20120020581 | 3/2012 |
| KR | 20130003744 | 1/2013 |
| SU | 1094923 | 5/1984 |

\* cited by examiner

COUPLING STRUCTURE FOR EASY INSTALLATION AND SEPARATION OF FAUCET

TECHNICAL FIELD

The present invention relates to a structure for coupling a faucet to a water supply pipe through which water is supplied, and in particular, to a coupling structure for easy installation and separation of a faucet.

BACKGROUND

Water supply units are collectively referred to as a device which is installed in an indoor wall, receives water supplied from a water supply source through a water supply pipe, and finally discharges the supplied water through a faucet or water discharge pipe.

As shown in FIG. 1, such a water supply unit includes a faucet 300, and a connection body 100 which connects the faucet to a water supply pipe for delivering water supplied from a water supply source to the faucet. The connection body 100 is formed such that the water supply pipe for supplying water is connected to one side of the connection body 100 and the faucet 300 is connected to an opposite side of the connection body 100. The aforementioned water supply unit is disclosed in Korean Patent Application Publication No. 10-2010-0063411 entitled "Water supply unit having stop function" and published on Jun. 11, 2010.

In general, the connection body 100 is installed as embedded in a wall, and interconnects the faucet and the water supply pipe. In this regard, a housing 200 is embedded in the wall and provides a space in which the connection body 100 can be accommodated.

Further, the faucet 300 may be threadedly coupled to the connection body 100. However, the thread coupling is configured such that a nut is fastened for coupling in the state where a connection portion of the faucet 300 abuts on the connection body 100. The thread coupling causes inconvenience since the thread coupling requires an additional tool and it takes a long time for the thread coupling.

To solve the aforementioned problems, as disclosed in Korean Utility Model Registration No. 20-0172079 issued on Nov. 25, 1995 and entitled "Grab ring for connector of plumbing pipe," there has been proposed a configuration wherein a part called a grab ring is installed in the connection body and a connection pipe formed in the faucet is coupled to the connection body through the grab ring. The grab ring is formed with a plurality of sawteeth which are inclined in one direction. Thus, as the connection pipe formed in the faucet is moved forward, the connection pipe can be fitted to the grab ring. However, when the connection pipe is moved backward, the sawteeth strongly press an outer peripheral surface of the connection pipe to prevent extraction. The aforementioned configuration enables the faucet to be conveniently coupled to the connection body without being easily separated from the connection body, thereby firmly maintaining the coupled state. Of course, in the aforementioned configuration, it is a matter of course that a packing for water tightness is provided between the connection body and the connection pipe formed in the faucet.

The aforementioned configuration of coupling the faucet to the connection body with the grab ring is advantageous since the coupling operation is convenient. However, it has problems since it is difficult to separate the faucet from the connection body in order to replace or repair the faucet. To separate the faucet, the sawteeth formed on the grab ring must be pushed and opened. However, it is difficult to ensure a sufficient working space due to the installation of the faucet in a limited space, and it is difficult to use a tool due to a small size of the faucet, thus resulting in the aforementioned problems.

SUMMARY

The present invention solves the aforementioned problems. It is an object of the present invention to obtain a coupling structure for easy installation and separation of a faucet, which allows the faucet to be easily installed and further to be conveniently separated when replacement, maintenance or repair of the faucet is needed.

The present invention achieves the object by proposing a means for easily opening the sawteeth formed in a grab ring to allow the faucet to be separated when the faucet is needed to be separated.

According to the present invention, the faucet can be easily installed, thus enhancing convenience in construction. Further, the faucet can be easily separated when necessary, thus enhancing convenience in maintenance.

DETAILED DESCRIPTION

Figure 1:
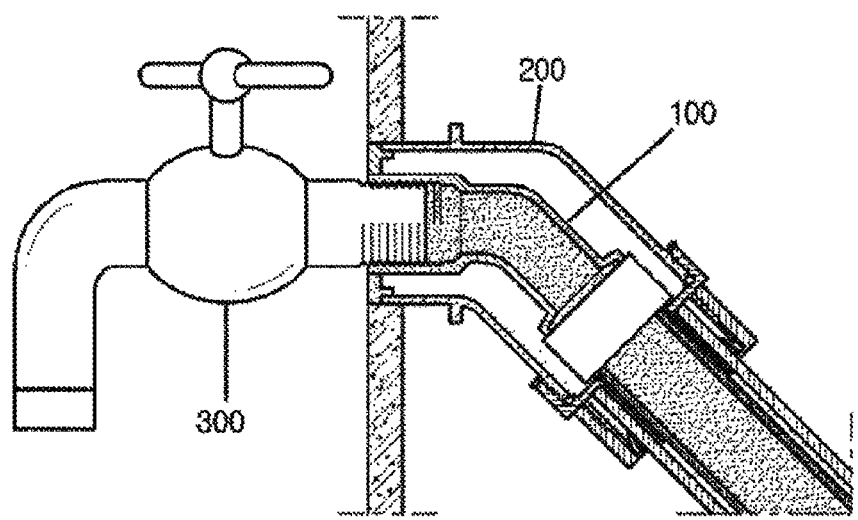
FIG. 1 is a view illustrating a state where a conventional faucet is installed and coupled to a connection body.
Figure 2:
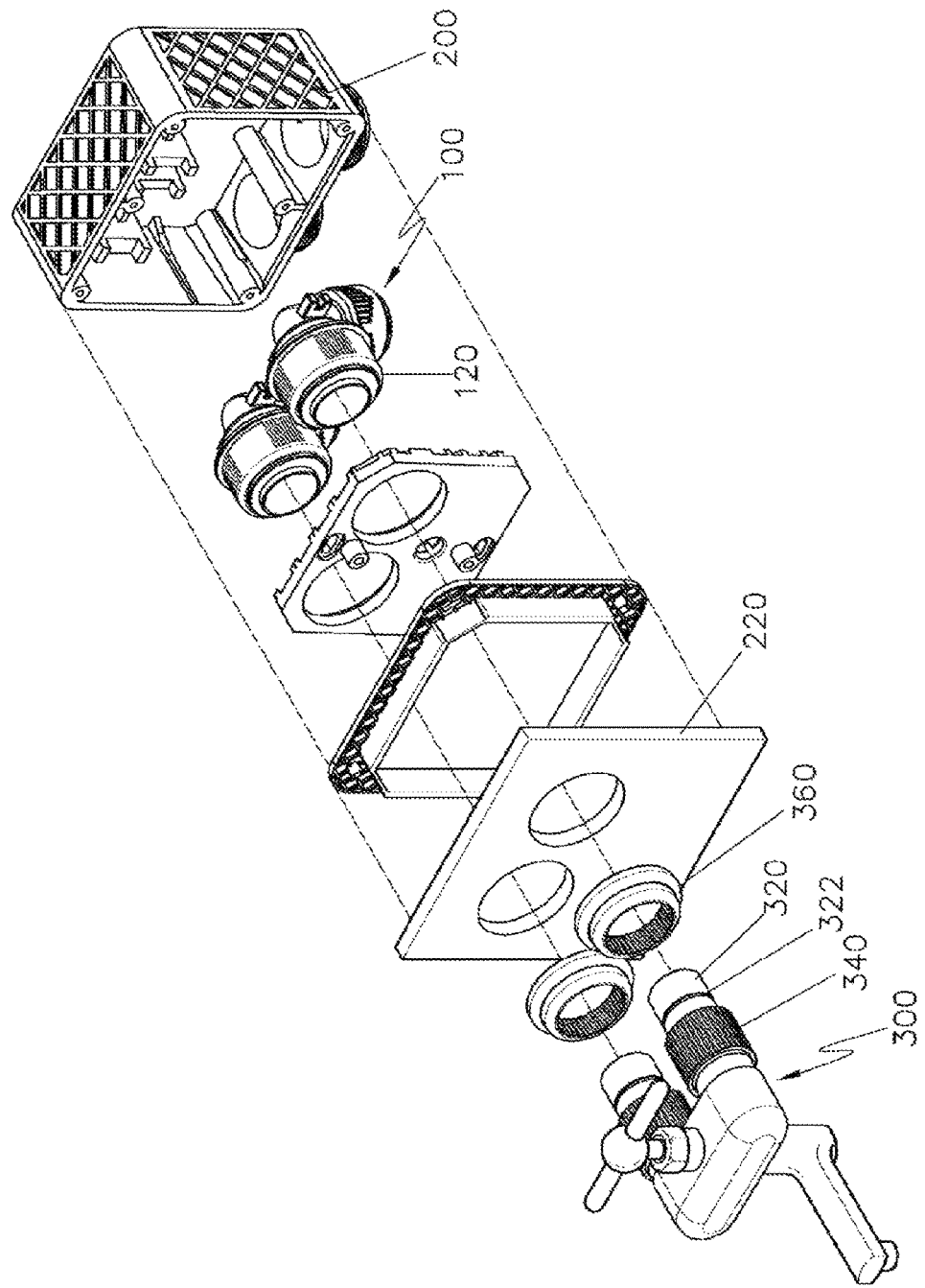
FIG. 2 is an exploded view showing a configuration of a faucet according to the present invention.
Figure 3:
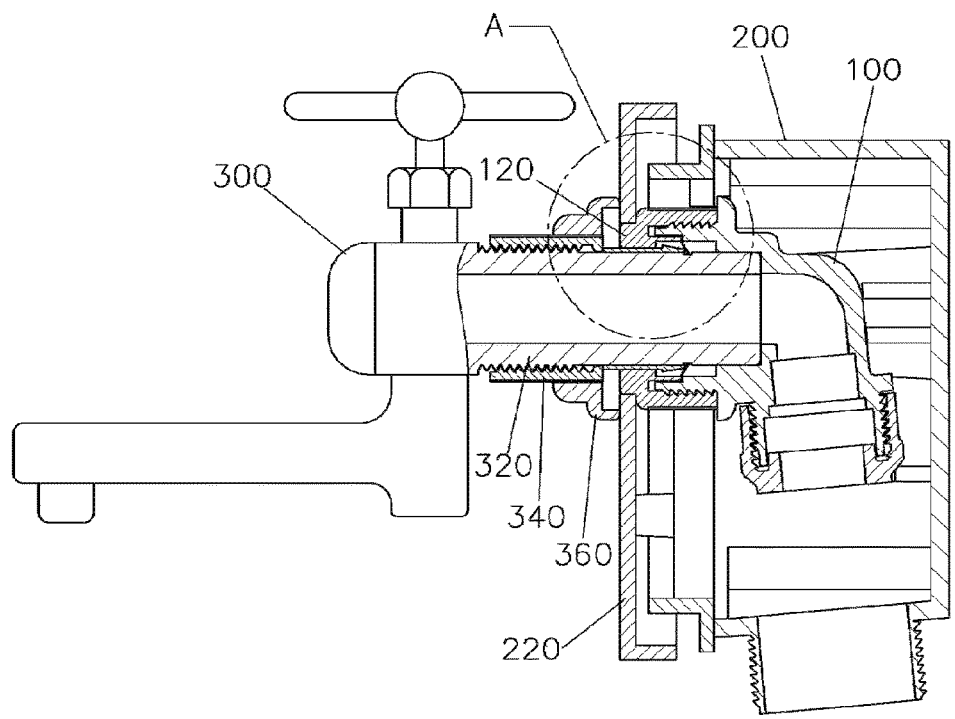
FIG. 3 is a sectional view showing a state where components shown in FIG. 2 are assembled.
Figure 4:
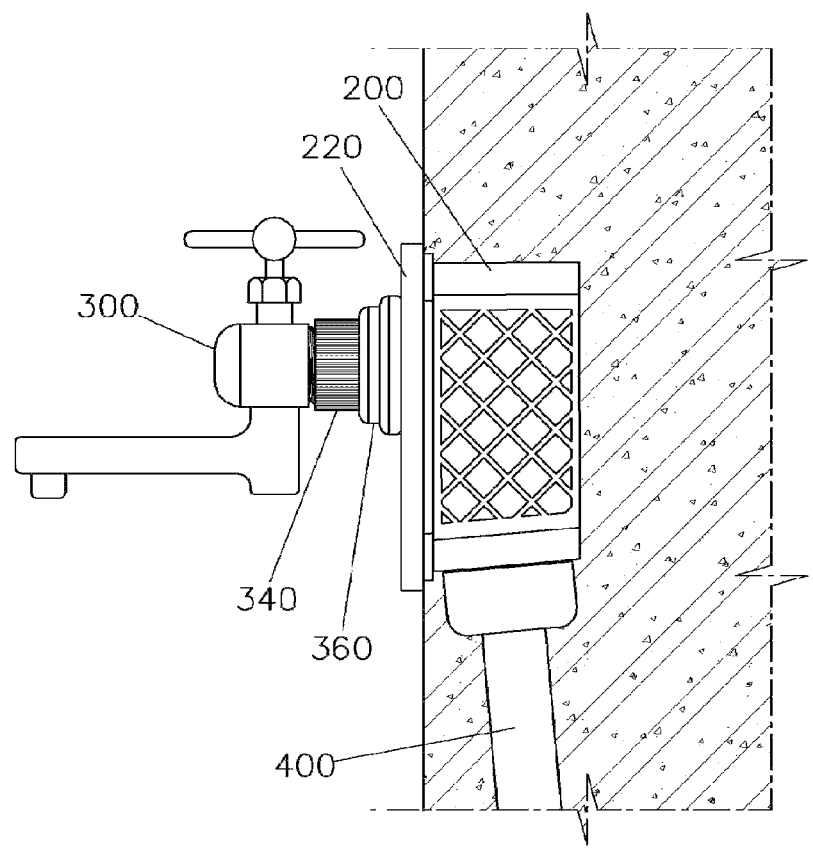
FIG. 4 is a view illustrating a state where the faucet is installed.

The present invention proposes a coupling structure for easy installation and separation of a faucet, which allows the faucet to be easily installed and to be conveniently separated when replacement, repair or maintenance of the faucet is needed.

A coupling structure for easy installation and separation of a faucet includes a connection body which is connected to a water supply pipe at one side and has a coupler at the opposite side. A connection pipe formed in the faucet is fitted to the coupler such that the faucet is coupled to the connection body to allow the faucet to be supplied with water and to discharge the water.

A grab ring is formed in the coupler. An actuation ring is installed in the connection pipe so as to be moved forward and backward. When the actuation ring is moved forward, the actuation ring expands the grab ring to allow the connection pipe to be separated from the coupler.

Hereinafter, the present invention is described in detail with reference to FIGS. 2 to 6 of the accompanying drawings.

A faucet 300 according to the present invention is separably fixed to a connection body 100. The connection body 100 is installed in a housing 200 which is embedded in a wall. The connection body 100 is generally formed in an L-like shape. A coupler 120, to which the faucet 300 is connected, is formed at an upper portion of the connection body 100, and a water supply pipe 400 is connected to a lower portion of the connection body 100. With this configuration, water flowing through the water supply pipe 400 is supplied to the faucet 300 through the connection body 100.

A front cover 220 is provided at a front of the housing 200. When the connection body 100 is installed or the water supply pipe 400 is connected to the connection body 100, the front cover 220 is opened and closed for opening the interior of the housing 200. The housing 200 may be generally made of plastic but is not limited thereto.

The coupler 120 formed in the connection body 100 is exposed to the outside through the front cover 220. In other words, the coupler 120 is exposed outward from the wall. In this state, the faucet 300 is coupled to the coupler 120. A connection pipe 320 is formed in the faucet 300. The connection pipe 320 is coupled to the coupler 120 by being fitted to the coupler 120.

A grab ring 140 is provided in the coupler 120. The grab ring 140 is formed in a ring shape and has sawteeth protruding toward a center. These sawteeth are inclined in a direction toward the inside of the coupler 120. Therefore, when the connection pipe 320 formed in the faucet 300 is fitted to the coupler 120, a distal end of the connection pipe 320 pushes the sawteeth together with the forward movement of the connection pipe 320 and the connection pipe is fitted to the coupler. On the other hand, when the connection pipe 320 is moved backward, the sawteeth are erected as they rub against an outer peripheral surface of the connection pipe 320. Thus, the connection pipe 320 is not easily pulled out from the coupler 120. The above-described configuration of the grab ring 140 is not significantly different from that of a known grab ring.

In the above-described configuration where the grab ring 140 is provided, a catching groove 322 is formed on the outer periphery of the connection pipe 320. The catching groove 322 is formed such that tips of the sawteeth are caught in the catching groove 322 and do not fall out of the catching groove 322. A suitable sealing means such as a packing may be provided to fill up a gap between the connection pipe 320 and the coupler 120, thereby preventing leakage of supplied water.

Further, when the faucet 300 needs to be replaced, the connection pipe 320 must be extracted from the coupler 120 by pulling the faucet 300. However, although the connection pipe 320 is pulled so as to be extracted, the connection pipe 320 is not easily extracted because the sawteeth press the outer peripheral surface of the connection pipe 320. In particular, where the sawteeth are caught in the catching groove 322, it is burdensome to the extent of being actually impossible to extract the connection pipe. Therefore, a means, which opens the sawteeth by pushing and tilting the sawteeth such that the connection pipe 320 can be extracted, is necessary. In the present invention, an actuation ring 340, which is fitted to an outer periphery of the connection pipe 320, is employed as the means capable of tilting the sawteeth.

The actuation ring 340 is formed to have a pipe shape and a predetermined length. The actuation ring 340 is configured to be moved forward and backward along the connection pipe 320. As the actuation ring 340 is moved forward, a leading end of the actuation ring 340 moves into the coupler 120 formed in the connection body 100 and thus pushes the sawteeth which press the outer periphery of the connection pipe 320. As a result, the sawteeth are tilted and separated from the outer periphery of the connection pipe 320. In this state, if the connection pipe 320 is moved backward, the connection pipe 320 falls out of the coupler 120 together with the backward movement of the connection pipe 320.

An excessive forward movement of the actuation ring 340 may cause the leading end of the actuation ring 340 to go past the grab ring 140. Thus, it is a matter of course to appropriately adjust a forward movement distance of the actuation ring 340.

Figure 5:
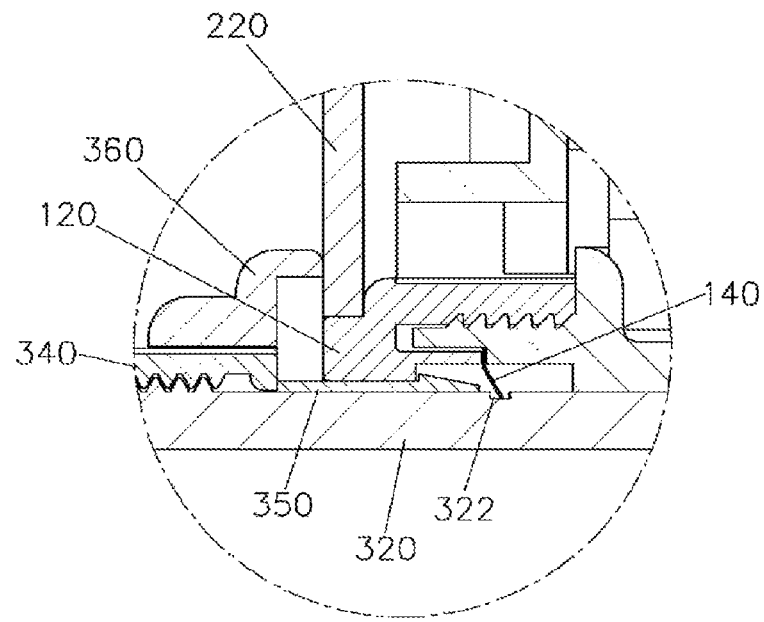
FIGS. 5 and 6 are enlarged views of a portion "A" shown in FIG. 2, illustrating the actuation wherein a sawtooth is pushed in response to a movement of an actuation ring.
Figure 6:
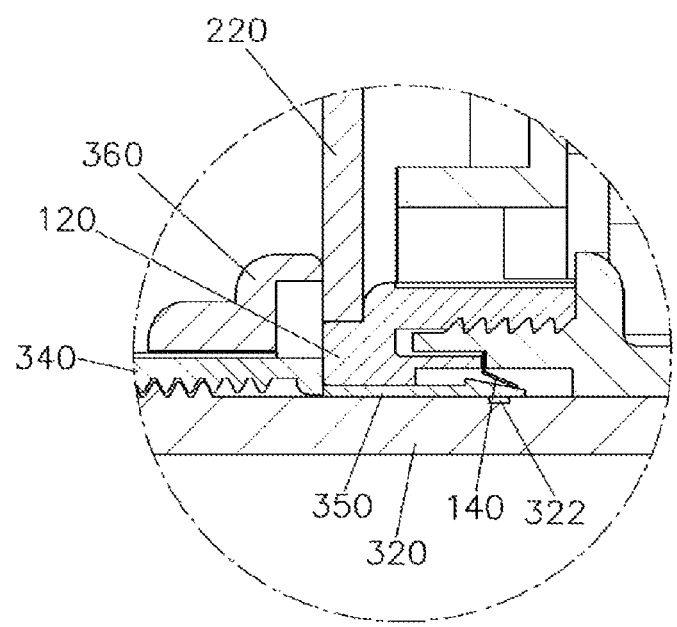

Unlike the above-described configuration where the actuation ring 340 directly pushes the sawteeth of the grab ring 140, the actuation ring may be configured to indirectly push the sawteeth. As shown in FIGS. 5 and 6, a pressure ring 350, which is moved forward and backward and presses the sawteeth, is provided between the actuation ring 340 and the sawteeth. With this configuration, the sawteeth are pushed and tilted since the actuation ring 340 pushes the pressure ring 350. In this case, a trailing end of the pressure ring 350 is exposed outward from the coupler 120 and the pressure ring is pushed by the actuation ring 340 outside the coupler 120. A leading end of the pressure ring 350 is formed to be inclined in an arrow shape. Thus, the leading end of the pressure ring can push the sawteeth in inclined contact with the sawteeth.

In the above-described configuration, if the actuation ring 340 comes into contact with an entrance of the coupler 120, the actuation ring 340 cannot be moved forward any longer. For this reason, a maximum distance by which the pressure ring 350 can be moved forward is determined by a length of a portion of the pressure ring 350 that is exposed outward from the coupler 120. Therefore, the outward-exposed length is determined by pre-calculating a length by which the sawteeth can be stably pushed and returned to an original position when a force pushing the sawteeth is removed.

The actuation ring 340 may be installed so as to be threadedly engaged with the connection pipe 320 and to be moved forward and backward along screw threads. The screw threads are formed on both the connection pipe 320 and an inner peripheral surface of the actuation ring 340 such that the actuation ring 340 and the connection pipe 320 are threadedly engaged with each other. With this configuration, a forward or backward movement distance of the actuation ring 340 can be easily adjusted. Further, the actuation ring can be fixed in position without being pushed under the state where the actuation ring is moved forward or backward by a desired distance.

In the above-described configuration where the actuation ring 340 is threadedly engaged with the connection pipe 320, corrugations may be formed on an outer periphery of the actuation ring 340. This can maximize friction when the actuation ring 340 is grasped and rotated by a hand or tool. Thus, actuation ring 340 can be smoothly actuated without slipping.

A finish cap 360 is disposed between the actuation ring 340 and the coupler 120. The finish cap 360 is formed such that the connection pipe 320 and the actuation ring 340 pass through the finish cap 360. The finish cap 360 serves to cover a portion of the coupler 120 that is exposed outward from the housing 200, thus providing a neat external appearance. Additionally, in the present invention, to more easily rotate the actuation ring 340, the actuation ring 340 is formed so as to be rotated together with the finish cap 360.

The configuration where the actuation ring 340 is rotated together with the finish cap 360 can be achieved by forming the outer periphery of the actuation ring 340 and an inner periphery of the finish cap 360 with corrugations in the form of gear teeth. By doing so, the rotation of the finish cap 360 enables the actuation ring 340 to be moved forward and backward. Further, if necessary, to facilitate rotation of the finish cap 360, an outer peripheral shape of the finish cap 360 may be formed in a polygonal shape.

According to the above-described coupling structure for a faucet according to the present invention, the faucet 300 can be easily installed since the faucet 300 is easily coupled to the connection body 100 only by simply fitting the connection pipe 320 to the coupler 120. When the faucet 300 is separated, the connection pipe 320 can be extracted and separated from the coupler 120 by easily releasing, through the actuation ring 340, the state where the grab ring 140 presses the outer peripheral surface of the connection pipe 320. Accordingly, convenience in maintenance is enhanced.

What is claimed is:

1. A coupling structure for easy installation and separation of a faucet, the coupling structure comprising a connection body (100) which is connected to a water supply pipe (400) at one side and has a coupler (120) at an opposite side,
   wherein a connection pipe (320) formed in the faucet (300) is fitted to the coupler (120) such that the faucet (300) is coupled to the connection body (100) to allow the faucet (300) to be supplied with water and to discharge the water,
   wherein a grab ring (140) is formed in the coupler (120),
   wherein an actuation ring (340) is installed on the connection pipe (320) so as to be threadedly engaged with the connection pipe (320) and to be moved forward and backward along screw threads,
   wherein a pressure ring (350) is disposed between the actuation ring (340) and the grab ring (140),
   wherein a catching groove (322) is formed on an outer periphery of the connection pipe (320) such that sawteeth of the grab ring (140) are caught in the catching groove (322), and
   wherein when the actuation ring (340) is moved forward, the pressure ring (350) is pushed and moved forward by the movement of the actuation ring (340), and the grab ring (140) expands such that the grab ring (140) is disengaged from the catching groove (322) to allow the connection pipe (320) to be separated from the coupler (120).

2. The coupling structure of claim 1, wherein a finish cap (360) is disposed adjacent to the actuation ring (340),
   wherein the connection pipe (320) and the actuation ring (340) pass through the finish cap (360), and
   wherein the actuation ring (340) is formed so as to be rotated together with the finish cap (360).

* * * * *